United States Patent
Takahashi

(10) Patent No.: US 9,554,005 B2
(45) Date of Patent: Jan. 24, 2017

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Hirokazu Takahashi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 452 days.

(21) Appl. No.: 14/060,025

(22) Filed: Oct. 22, 2013

(65) Prior Publication Data

US 2014/0320897 A1 Oct. 30, 2014

(30) Foreign Application Priority Data

Apr. 25, 2013 (JP) ................................. 2013-092710

(51) Int. Cl.
*G06F 3/00* (2006.01)
*H04N 1/00* (2006.01)
(Continued)

(52) U.S. Cl.
CPC ...... *H04N 1/00411* (2013.01); *H04N 1/00482* (2013.01); *H04N 1/32122* (2013.01); *G06F 3/0482* (2013.01); *H04N 2201/0094* (2013.01); *H04N 2201/3205* (2013.01); *H04N 2201/3208* (2013.01); *H04N 2201/3273* (2013.01)

(58) Field of Classification Search
CPC ............ H04N 1/32106; H04N 1/00411; H04N 2201/3273; H04N 1/00482; H04N 1/32122; H04N 2201/0094; H04N 2201/3205; H04N 2201/3208; G06F 3/01; G06F 3/0482
See application file for complete search history.

(56) References Cited

U.S. PATENT DOCUMENTS

2005/0264846 A1 12/2005 Tsuzuki
2007/0070410 A1* 3/2007 Suzuki ............... H04N 1/00204
                                              358/1.15
(Continued)

FOREIGN PATENT DOCUMENTS

JP           11175296 A  *  7/1999  ............... G06F 3/12
JP         2005-335282 A    12/2005
(Continued)

OTHER PUBLICATIONS

Jul. 19, 2016 Office Action issued in Japanese Patent Application No. 2013-092710.

*Primary Examiner* — William Bashore
*Assistant Examiner* — Gregory A Distefano
(74) *Attorney, Agent, or Firm* — Oliff PLC

(57) ABSTRACT

An information processing apparatus includes a reception unit and a display controller. The reception unit receives an operation for selecting a destination from a transmission destination list containing a registered mail address of the destination to which an image is to be transmitted. The display controller displays an object image in a predetermined display region. The object image indicates a parameter of an image reading unit that reads the image. When the destination is selected by the operation, the display controller makes the display region display the mail address registered in the transmission destination list in place of the object image. When a preset time period elapses, the display controller sets the display back to the object image.

19 Claims, 15 Drawing Sheets

(51) Int. Cl.
*H04N 1/32* (2006.01)
*G06F 3/0482* (2013.01)

(56) References Cited

U.S. PATENT DOCUMENTS

| | | | | |
|---|---|---|---|---|
| 2007/0097025 A1* | 5/2007 | Itoh | ............ | G09G 3/18 345/50 |
| 2007/0118814 A1* | 5/2007 | Greer | ............ | G06F 3/0482 715/810 |
| 2008/0295116 A1 | 11/2008 | Hoshino et al. | | |
| 2009/0021780 A1* | 1/2009 | Sato | ............ | H04N 1/00347 358/1.15 |

FOREIGN PATENT DOCUMENTS

| JP | 2007-096703 A | 4/2007 |
|---|---|---|
| JP | 2007-189750 A | 7/2007 |
| JP | A-2010-109751 | 5/2010 |
| JP | 2012-034023 A | 2/2012 |
| JP | 2012-108943 A | 6/2012 |

\* cited by examiner

FIG. 3
| REGISTRATION ID | DESTINATION NAME | E-MAIL ADDRESS | FAX NUMBER |
|---|---|---|---|
| 1 | Hanako XX | Hanako@##.com | aa-bbbb-cccc |
| ... | ... | ... | ... |
| 12 | Taro Yamada | yamada@∗∗.com | dd-eeee-ffff |
| 13 | Smith | Smith@∗∗.com | abc-def-ghi |
FIG. 4
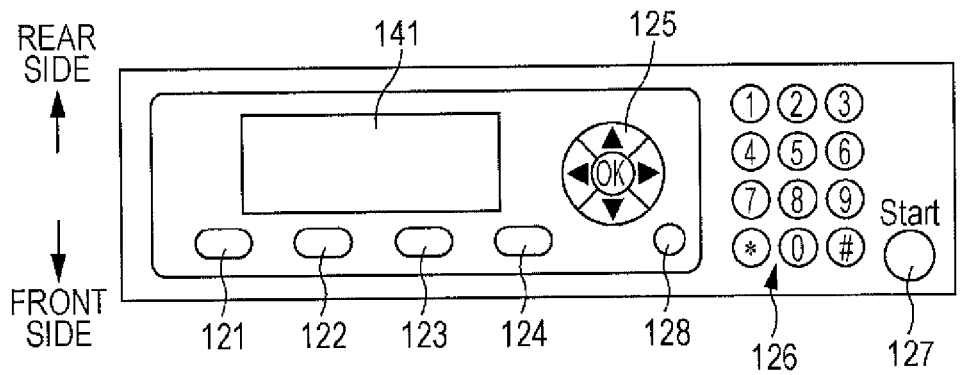
FIG. 5
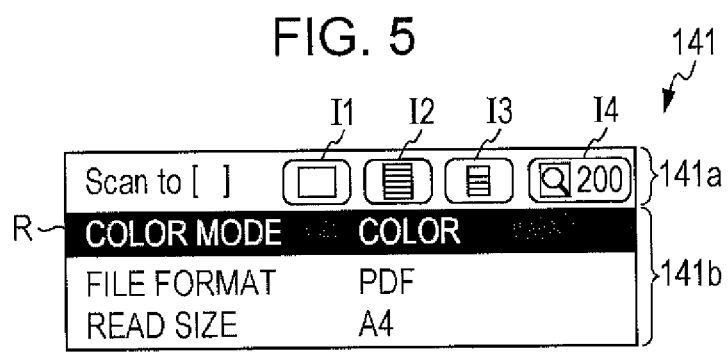

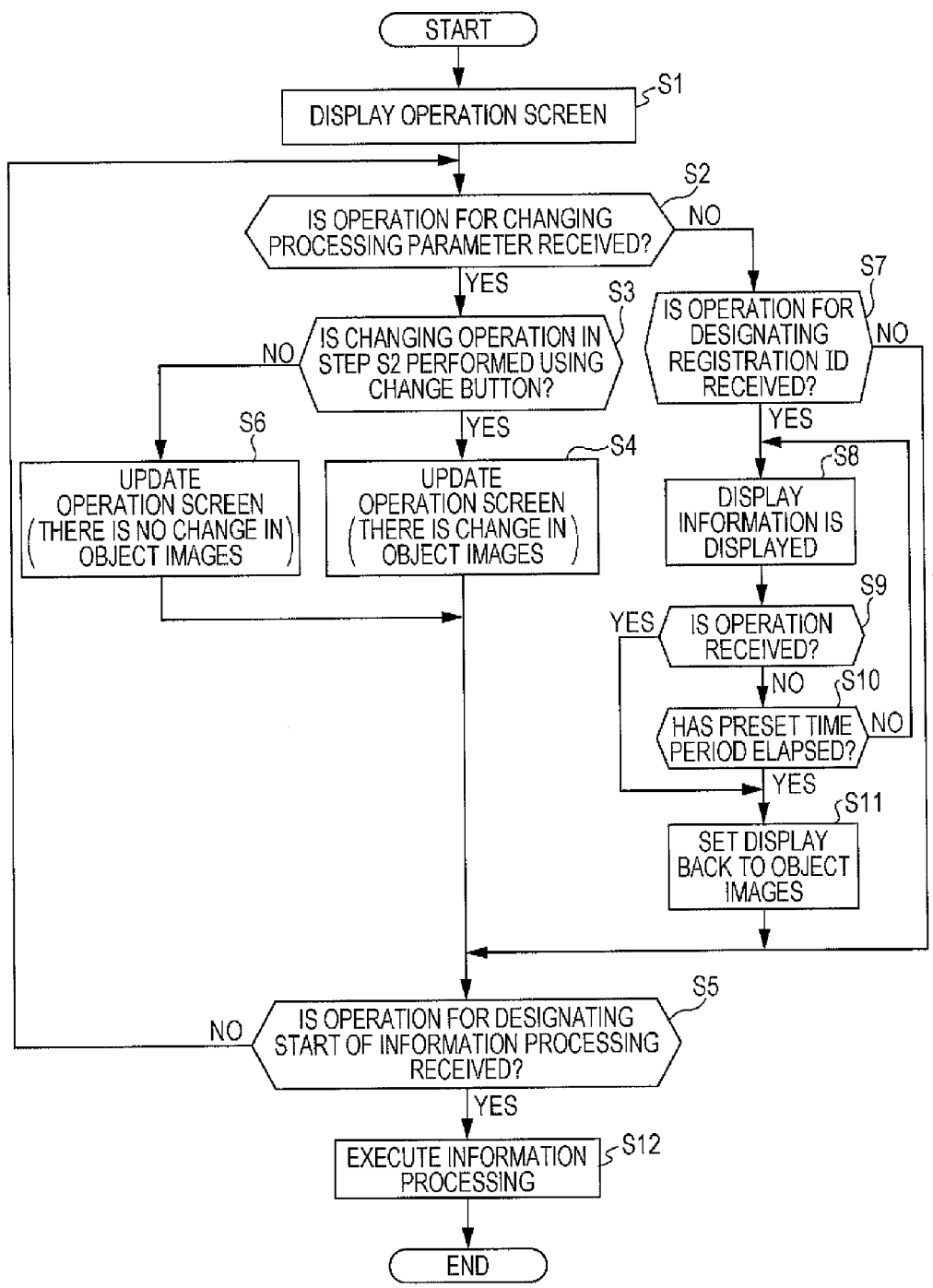

FIG. 8A
FIG. 8B
FIG. 8C
FIG. 8D
FIG. 8E
FIG. 8F
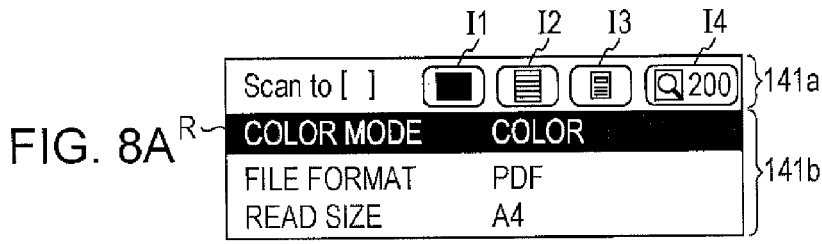
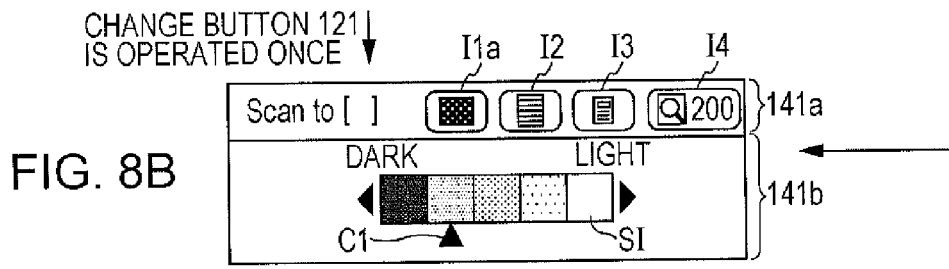
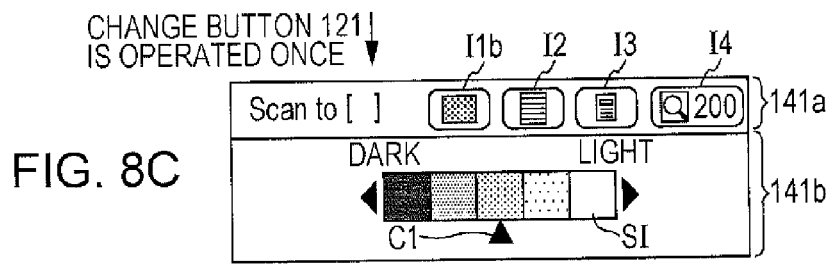
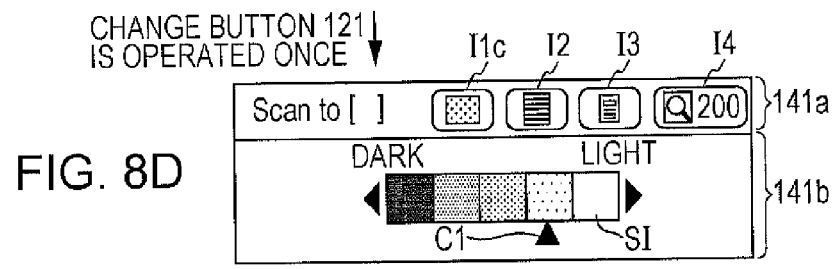
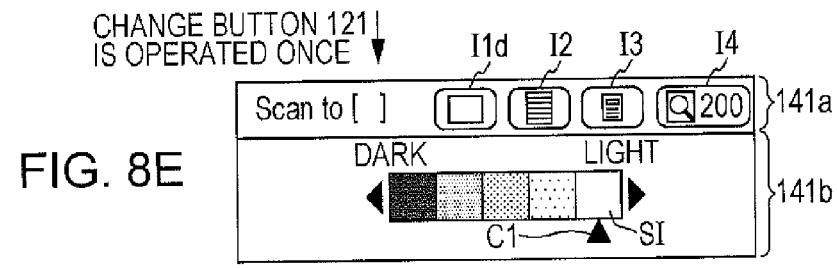
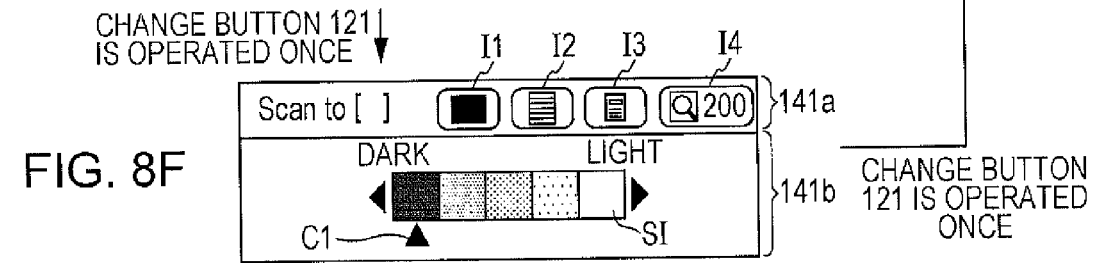

"COLOR MODE" IS SELECTED AND CONFIRM BUTTON IS OPERATED ↓

DOWN-DIRECTION BUTTON IS OPERATED ↓

DOWN-DIRECTION BUTTON IS OPERATED ↓

DOWN-DIRECTION BUTTON IS OPERATED

OPERATION FOR
DESIGNATING
REGISTRATION ID

PRESET TIME PERIOD
HAS ELAPSED

OPERATION FOR DESIGNATING REGISTRATION ID ↓

POUND(#) BUTTON IS OPERATED ↓

POUND(#) BUTTON IS OPERATED ↓

POUND(#) BUTTON IS OPERATED ↓

PRESET TIME PERIOD HAS ELAPSED

FIG. 15A

| Scan to [ ] | I1 ■ | I2 ▤ | I3 ▤ | I4 🔍200 | } 141a |
| COLOR MODE | COLOR | | | | } 141b |
| FILE FORMAT | PDF | | | | |
| READ SIZE | A4 | | | | |

R

↓ OPERATION FOR DESIGNATING REGISTRATION ID

FIG. 15B

| Scan to [12] | : Taro Yamada | } 141a |
| COLOR MODE | COLOR | } 141b |
| FILE FORMAT | PDF | |
| READ SIZE | A4 | |

R

↓ PRESET TIME PERIOD HAS ELAPSED

FIG. 15C

| Scan to [12] | : yamada@**.com | } 141a |
| COLOR MODE | COLOR | } 141b |
| FILE FORMAT | PDF | |
| READ SIZE | A4 | |

R

↓ PRESET TIME PERIOD HAS ELAPSED

FIG. 15D

| Scan to [12] | : E-mail | } 141a |
| COLOR MODE | COLOR | } 141b |
| FILE FORMAT | PDF | |
| READ SIZE | A4 | |

R

↓ PRESET TIME PERIOD HAS ELAPSED

FIG. 15E

| Scan to [12] | I1 ■ | I2 ▤ | I3 ▤ | I4 🔍200 | } 141a |
| COLOR MODE | COLOR | | | | } 141b |
| FILE FORMAT | PDF | | | | |
| READ SIZE | A4 | | | | |

R

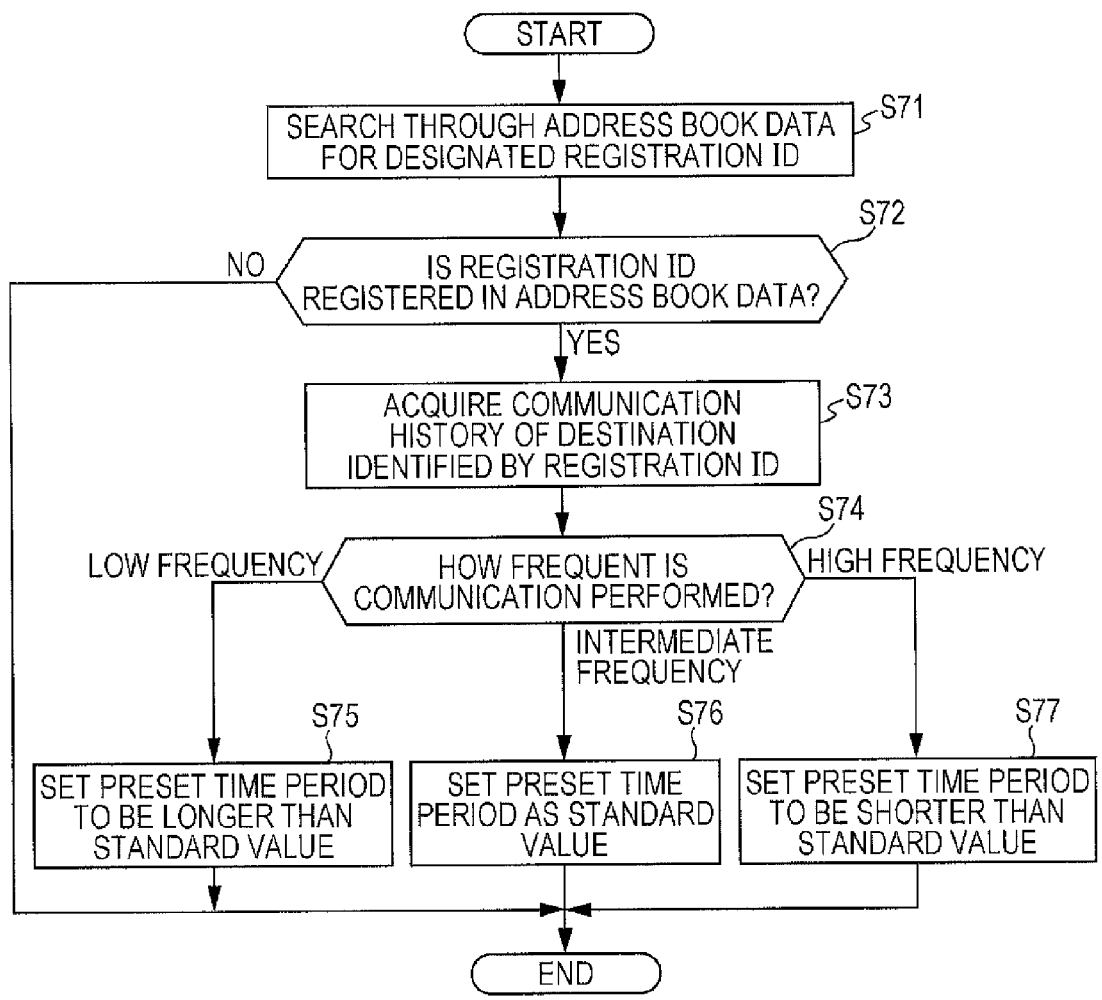

OPERATION FOR
DESIGNATING
REGISTRATION ID

ASTERISK (*) BUTTON
IS OPERATED

COMMAND DISPLAY
OF ADDRESS BOOK
SCREEN

CONFIRM BUTTON
IS OPERATED

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-092710 filed Apr. 25, 2013.

BACKGROUND

Technical Field

The present invention relates to information processing apparatuses and non-transitory computer readable media.

SUMMARY

According to an aspect of the invention, there is provided an information processing apparatus including a reception unit and a display controller. The reception unit receives an operation for selecting a destination from a transmission destination list containing a registered mail address of the destination to which an image is to be transmitted. The display controller displays an object image in a predetermined display region. The object image indicates a parameter of an image reading unit that reads the image. When the destination is selected by the operation, the display controller makes the display region display the mail address registered in the transmission destination list in place of the object image. When a preset time period elapses, the display controller sets the display back to the object image.

BRIEF DESCRIPTION OF THE DRAWINGS

An exemplary embodiment of the present invention will be described in detail based on the following figures, wherein:

FIG. 3 illustrates a configuration example of address book data according to the exemplary embodiment;

FIG. 4 illustrates the configuration of the image forming apparatus according to the exemplary embodiment at a position indicated by an arrow IV in FIG. 1;

FIG. 5 illustrates an operation screen displayed in the image forming apparatus;

FIG. 7 is a flowchart illustrating the flow of processing performed in the image forming apparatus;

FIGS. 8A to 8F illustrate the transition of the operation screen in the image forming apparatus when a read-density processing parameter is changed;

FIGS. 15A to 15E illustrate the transition of the operation screen in the image forming apparatus based on a display method C;

FIG. 16 is a flowchart illustrating the flow of processing executed when the image forming apparatus sets a preset time period;

DETAILED DESCRIPTION

An exemplary embodiment of the present invention will now be described with reference to the drawings. The following description relates to a case where an information processing apparatus according to an exemplary embodiment of the present invention is applied to an image forming apparatus.

Figure 1:
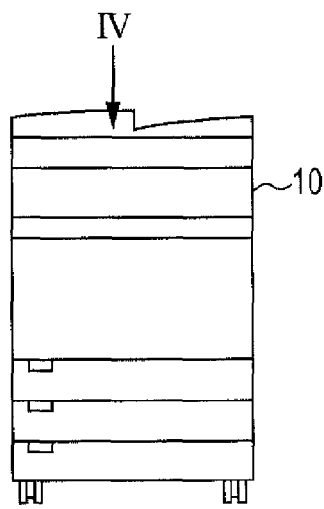
FIG. 1 is a front view of an image forming apparatus according to an exemplary embodiment of the present invention.

FIG. 1 is a front view of an image forming apparatus 10. As shown in FIG. 1, the image forming apparatus 10 is of a so-called console type and has, for example, a function of executing various kinds of information processing, such as scan processing, facsimile transmission processing, and copy processing. Among these various kinds of information processing, scan processing and facsimile transmission processing involve data transmission.

Figure 2:
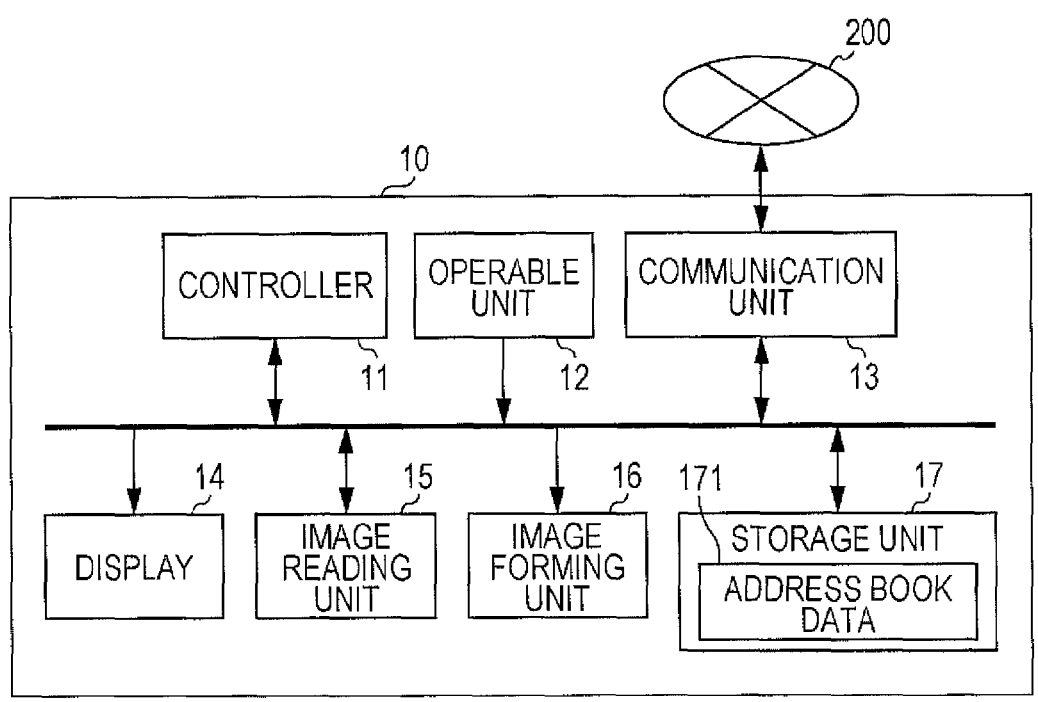
FIG. 2 is a block diagram illustrating a hardware configuration of the image forming apparatus.

FIG. 2 is a block diagram illustrating a hardware configuration of the image forming apparatus 10. As shown in FIG. 2, the image forming apparatus 10 includes a controller 11, an operable unit 12, a communication unit 13, a display 14, an image reading unit 15, an image forming unit 16, and a storage unit 17.

The controller 11 includes a memory and an arithmetic unit, including a central processing unit (CPU) and an application specific integrated circuit (ASIC), and controls each unit of the image forming apparatus 10. The operable unit 12 includes multiple operators and is operable by a user. The operable unit 12 supplies an operation signal indicating an operation performed by the user to the controller 11. The communication unit 13 includes, for example, a modem and is connected to a communication line 200, including the Internet or a telephone line, so as to serve as an interface that performs communication. When scan processing or facsimile transmission processing is to be executed in the image forming apparatus 10, the communication unit 13 transmits data to an external device via the communication line 200. The display 14 is, for example, a liquid-crystal display and displays an image (screen) on a display panel 141 (see FIG. 4).

The image reading unit 15 is, for example, a scanner that reads an image from a document and supplies image data expressing the read image to the controller 11. The image forming unit 16 is, for example, a printer that forms an image onto a sheet, such as paper, by performing an electrophotographic process. When scan processing is to be executed in the image forming apparatus 10, the controller 11 uses the communication unit 13 to transmit the image data generated by the image reading unit 15 reading the document to a destination specified by an electronic mail address. When facsimile transmission processing is to be executed in the image forming apparatus 10, the controller 11 uses the communication unit 13 to transmit the image data generated by the image reading unit 15 reading the document to a destination specified by a facsimile number. When copy processing is to be executed in the image forming apparatus 10, the controller 11 makes the image forming unit 16 form an image in accordance with the image data generated by the image reading unit 15 reading the document.

The storage unit 17 includes, for example, a hard disk device and stores a control program to be executed by the controller 11 as well as address book data 171. The address book data 171 is a transmission destination list containing registered information about each destination to which data is to be transmitted (which may sometimes be referred to as "data-transmission destination" hereinafter).

FIG. 3 illustrates a configuration example of the address book data 171. As shown in FIG. 3, the address book data 171 includes multiple records, each including a data set in which a registration ID, a destination name, an electronic mail address, and a facsimile number are associated with each other as a single record.

Each registration ID is identification information used for identifying a record and is expressed by a numerical value. Each data set associated with a single record in the address book data 171 corresponds to a single data-transmission destination. Thus, each registration ID may be considered as being equivalent to identification information (i.e., a destination ID) used for identifying a destination whose information is registered in the address book data 171.

Each destination name is the name of a data-transmission destination. This destination name is set by the user of the image forming apparatus 10 and is set to, for example, a personal name or a corporate name (such as a company's name). Each electronic mail address is transmission destination information used for transmitting data by using an electronic mail. Each facsimile number is transmission destination information used for transmitting data by facsimile transmission processing. Each of the electronic mail addresses and the facsimile numbers is a character string that specifies a data-transmission destination. The character strings vary from destination to destination.

In the example in FIG. 3, an electronic mail address and a facsimile number are set for each data-transmission destination. Alternatively, either one of an electronic mail address and a facsimile number may be set for each destination.

FIG. 4 illustrates the configuration of the image forming apparatus 10 at a position indicated by an arrow IV in FIG. 1. As shown in FIG. 4, the position of the image forming apparatus 10 indicated by the arrow IV is provided with the display panel 141 constituting the display 14, as well as operation buttons (physical buttons in this case) constituting the operable unit 12. Examples of the operation buttons include change buttons 121, 122, 123, and 124, a direction/confirm button 125, a numerical keypad 126, a start button 127, and an address book button 128. The user may stand in front of the image forming apparatus 10 to view an image displayed on the display panel 141 or to operate the operation buttons of the operable unit 12. In this case, the display panel 141 has a rectangular display region that is longer in the horizontal direction than in the vertical direction.

The change buttons 121, 122, 123, and 124 are operated for designating (that is, changing) processing conditions for information processing to be executed in the image forming apparatus 10. The change buttons 121 to 124 each correspond to one of the processing conditions for information processing and also correspond to processing conditions of different kinds. The direction/confirm button 125 includes four direction buttons used for designating up, down, left, and right directions, and a confirm button that is surrounded by the four direction buttons and that is used for confirming the items designated by the user. The numerical keypad 126 includes numerical buttons used for designating numerical values from "0" to "9", an asterisk (*) button, and a pound (#) button. The start button 127 is to be operated when inputting a command for commencing information processing. The address book button 128 is to be operated when inputting a command for displaying an address book screen containing information registered in the address book data 171.

FIG. 5 illustrates an operation screen R displayed on the display panel 141. The operation screen R is used for designating processing conditions for scan processing. The display panel 141 has a display region with a size that displays about 30 characters multiplied by four rows worth of character strings. In the following description, the display region of the display panel 141 is described as having a display region 141a that corresponds to the first row and a display region 141b that corresponds to the second to the fourth row.

In FIG. 5 and other drawings, a highlighted character string in the display region 141b indicates that a cursor is set on this character string. An operation performed by using the cursor will be described later.

In the display region 141a, a character string that reads "Scan to [*]" (the section of [*] in FIG. 5 is blank) is displayed at the left side, as viewed from the user. This character string indicates a transmission destination for image data generated by scan processing. If a transmission destination is not set, the section in the brackets is left blank, as shown in FIG. 5. If a destination registered in the address book data 171 is set as the transmission destination, the registration ID of that destination is displayed in the brackets.

Furthermore, in the display region 141a, object images I1, I2, I3, and I4 (icon images in this case) are arranged in this order from the left at the right side of the character string "Scan to [*]", as viewed from the user. The object images I1 to I4 correspond to different processing conditions for scan processing and are images each indicating (symbolizing) a selected processing parameter for the corresponding processing condition.

Specifically, the object image I1 corresponds to "read density", which is a processing condition for designating a document read density by the image reading unit 15. With regard to this read density, one processing parameter is selected from among five processing parameters with different (i.e., five levels of) read densities. The object image I1 is an image indicating that "maximum density" is selected as the read density. If the read-density processing parameter is to be changed, the change button 121 is operated by the user.

The object image I2 corresponds to "document type", which is a processing condition for designating the type of document to be read by the image reading unit 15. With regard to this document type, one processing parameter is selected from among three processing parameters, which include "text" indicating that text is included, "photo and text" indicating that text and a photographic image are included in a well-balanced manner, and "photo" indicating that a photographic image is included. The object image I2 is an image indicating that "text" is selected as the document type. If the document-type processing parameter is to be changed, the change button 122 is operated by the user.

The object image I3 corresponds to "double-faced folded document", which is a processing condition for designating whether a document to be read is single-faced or double-faced and a direction in which the document is folded if double-faced. With regard to this double-faced folded document condition, one processing parameter is selected from among three processing parameters, which include "null" indicating a single-faced document, "Flip on Long Edge" indicating a double-faced document folded along its long side, and "Flip on Short Edge" indicating a document folded along its short side. The object image I3 is an image indicating that "null (single-faced document)" is selected as the double-faced folded document condition. If the processing parameter for the double-faced folded document condition is to be changed, the change button 123 is operated by the user.

The object image I4 corresponds to "transmission resolution", which is a processing condition for designating the resolution when a document read by the image reading unit 15 is to be transmitted. With regard to this transmission resolution, one processing parameter is selected from among four processing parameters, which include "200×200 dpi (dots per inch)", "300×300 dpi", "400×400 dpi", and "600× 600 dpi" as the resolution in the vertical and horizontal directions. The object image I4 is an image indicating that "200×200 dpi" is selected as the transmission resolution. If the transmission-resolution processing parameter is to be changed, the change button 124 is operated by the user.

An i-th displayed object image from the left (i=1 to 4) among the object images I1 to I4 and an i-th change button from the left among the change buttons 121 to 124 correspond to the same processing condition. With regard to each of the object images I1 to I4, when the processing parameter for the corresponding processing condition is changed, the object image is changed to the object image that indicates the changed processing parameter. The changing of the object images will be described later.

The display region 141b displays information about processing conditions different from the processing conditions corresponding to the change buttons 121 to 124. The display region 141b corresponds to the second to fourth rows of the display panel 141 and displays the names of processing parameters and the character strings, which indicate the selected processing parameters, in association with each other.

As shown in FIG. 5, a region corresponding to the second row of the display panel 141 displays a character string "color mode" as a processing condition and a character string "color" that indicates the selected processing parameter for the color mode. The color mode is a processing condition for designating the color or colors of an image to be read by the image reading unit 15. With regard to this color mode, one processing parameter is selected from among three processing parameters, which include "color" in which red (R), green (G), and blue (B) charged coupled devices (CCDs) included in the image reading unit 15 are used, "Black & White" in which a monochrome CCD is used alone, and "auto" in which the controller 11 determines which CCD or CCDs to use in accordance with the color or colors used in the document.

A region corresponding to the third row of the display panel 141 displays a character string "file format" as a processing condition and a character string "PDF (portable document format)" indicating the selected processing parameter for the file format. The file format is a processing condition for designating the file format of image data to be generated by the image reading unit 15. With regard to this file format, one processing parameter is selected from among multiple processing parameters with different file formats, such as PDF.

A region corresponding to the fourth row of the display panel 141 displays a character string "read size" as a processing condition and a character string "A4" indicating the selected processing parameter for the size of a document to be read. With regard to the read size, one processing parameter is selected from among multiple processing parameters with different read sizes, such as A4.

With regard to the color-mode, file-format, and read-size processing conditions displayed in the display region 141b, these processing parameters are changed by operating the direction/confirm button 125 instead of the change buttons 121 to 124.

Although a detailed description and a detailed illustration will be omitted here, when the processing conditions for facsimile transmission processing or copy processing are to be changed, the change buttons 121 to 124 similarly correspond to different processing conditions and are operated for changing the processing parameters for the corresponding processing conditions. Moreover, the display region 141b displays information about processing conditions that are different from the processing conditions corresponding to the change buttons 121 to 124.

Figure 6:
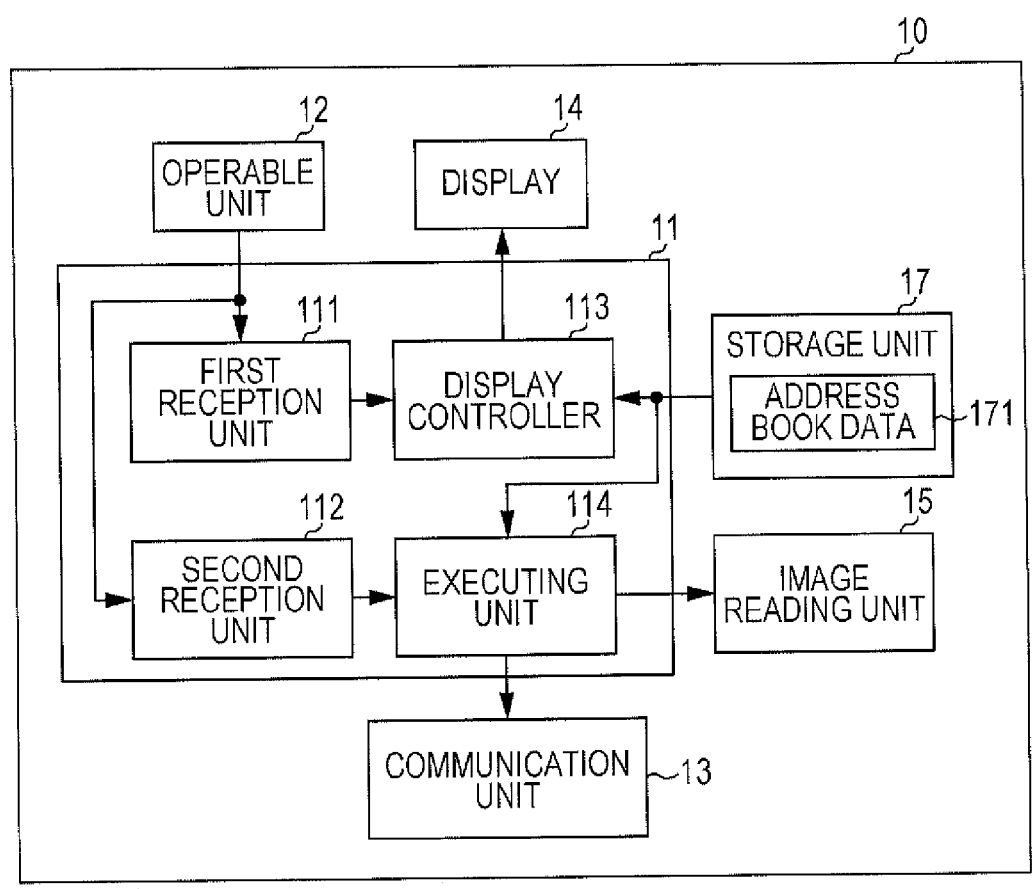
FIG. 6 is a block diagram illustrating a functional configuration of a controller of the image forming apparatus.

FIG. 6 is a block diagram illustrating a functional configuration of the image forming apparatus 10. As shown in FIG. 6, the controller 11 of the image forming apparatus 10 executes the control program stored in the storage unit 17 so as to achieve functions corresponding to a first reception unit 111, a second reception unit 112, a display controller 113, and an executing unit 114.

The first reception unit 111 receives an operation (first operation) for selecting a data-transmission destination from the address book data 171. For example, such an operation for selecting a data-transmission destination is received by the first reception unit 111 when an operation for designating a registration ID is performed by using the numerical keypad 126. Furthermore, when the address book screen is displayed on the display panel 141 on the basis of the address book data 171, the first reception unit 111 receives an operation involving the use of the direction/confirm button 125 for selecting a destination.

The second reception unit 112 receives an operation (second operation) for changing a selected processing parameter to one of multiple processing parameters selectively used in information processing. When there are multiple processing conditions for information processing, the second reception unit 112 receives an operation for changing a processing parameter for each processing condition. For example, the second reception unit 112 receives an operation involving the use of the change buttons 121 to 124 for changing the corresponding processing parameters as well as an operation involving the use of the direction/confirm button 125 for changing a processing parameter.

The display controller 113 performs display control for displaying an image on the display panel 141 of the display 14. For example, when a data-transmission destination is designated by using the numerical keypad 126, the display controller 113 displays display information including information about this destination registered in the address book data 171 in place of the object images in the display region 141a. When a preset time period elapses after displaying the display information, the display controller 113 sets the display back to the object images.

Furthermore, when one of the processing parameters for the processing conditions corresponding to the object images displayed in the display region 141a is changed in response to an operation received by the second reception unit 112, the display controller 113 changes the corresponding displayed object image to an object image indicating the changed processing parameter. When one of the processing parameters for the processing conditions corresponding to the information displayed in the display region 141b is changed in response to an operation received by the second reception unit 112, the display controller 113 changes the corresponding character string indicating the selected processing parameter displayed in the display region 141b.

The executing unit 114 controls each unit of the image forming apparatus 10 so that information processing is executed by using the selected processing parameters. When scan processing or facsimile transmission processing is to be executed, the executing unit 114 transmits image data generated by the image reading unit 15 to the selected destination by using the communication unit 13.

FIG. 7 is a flowchart illustrating the flow of processing when scan processing is performed in the image forming apparatus 10. FIGS. 8A to 8F illustrate the transition of the operation screen when the read-density processing parameter is changed.

In step S1, for example, when the power of the image forming apparatus 10 is turned on or when a specific operation is performed, the controller 11 of the image forming apparatus 10 controls the display 14 so as to make the display panel 141 display an operation screen related to scan processing. In this case, the controller 11 makes the display panel 141 display the operation screen R shown in FIG. 5. The operation screen R is displayed when, for example, standard-setting processing parameters are selected.

Subsequently, in step S2, the controller 11 determines whether an operation for changing a processing parameter is received. Specifically, in step S2, the controller 11 determines whether an operation using the change buttons 121 to 124 or an operation using the direction/confirm button 125 is performed. If the determination result in step S2 indicates "YES", the controller 11 determines whether the operation for changing a processing parameter is an operation performed by using the change buttons 121 to 124 in step S3. If the controller 11 determines that the operation has been performed by using the change buttons 121 to 124 (YES in step S3), the controller 11 updates the operation screen R so as to change the object images in the display region 141a in step S4.

The following description relates to a case where the change button 121 is operated once by the user for changing the read-density processing parameter. In this case, the controller 11 changes the read-density processing parameter in response to one operation of the change button 121 so as to decrease the read density by one level. When a processing parameter is changed in response to an operation using a change button, the controller 11 updates the information about the selected processing parameter stored in the memory or the storage unit 17 every time such an operation is performed. In step S4, the controller 11 updates the operation screen to that shown in FIG. 8B in response to the changing of the processing parameter.

Specifically, the controller 11 changes the object image I1 in the display region 141a to an object image I1a. The object image I1 indicates that the read density is set at the maximum level among five density levels, whereas the object image I1a indicates that the read density is set at the second highest level among the five density levels. Furthermore, the controller 11 makes the display region 141b display options for the read-density processing parameter as well as information about the selected processing parameter. Specifically, the controller 11 displays a scale image SI having five cells that correspond to five options for the read-density processing parameter, and also displays a cursor C1 at a position corresponding to the selected processing parameter. In this case, the controller 11 displays the cursor C1 at a position corresponding to the second cell from the left of the scale image SI.

After updating the operation screen in step S4, the controller 11 determines whether an operation for designating a start of information processing is received in step S5. Specifically, in step S5, the controller 11 determines whether the start button 127 is operated while the operation screen is displayed. If the controller 11 determines that an operation for designating a start of information processing is not received yet (NO in step S5), the controller 11 returns to step S2.

The following description relates to the operation of the image forming apparatus 10 when the change button 121 is operated multiple times by the user after the operation screen shown in FIG. 8B is updated. In this case, the controller 11 performs the process from steps S2 to S6 repeatedly for the number of times the change button 121 is operated.

When the change button 121 is operated once while the operation screen shown in FIG. 8B is displayed, the controller 11 updates the operation screen to that shown in FIG. 8C. In other words, the controller 11 changes the object image I1a to an object image I1b indicating that the read density is set at the third highest level among the five density levels. Moreover, the controller 11 displays the cursor C1 at a position corresponding to the third cell from the left of the scale image SI. When the change button 121 is operated once while the operation screen shown in FIG. 8C is displayed, the controller 11 updates the operation screen to that shown in FIG. 8D. In other words, the controller 11 changes the object image I1b to an object image I1c indicating that the read density is set at the fourth highest level among the five density levels. Moreover, the controller 11 displays the cursor C1 at a position corresponding to the fourth cell from the left of the scale image SI. When the change button 121 is operated once while the operation screen shown in FIG. 8D is displayed, the controller 11 updates the operation screen to that shown in FIG. 8E. In other words, the controller 11 changes the object image I1c to an object image I1d indicating that the read density is set at the fifth highest level (i.e., the lowest level) among the five density levels. Moreover, the controller 11 displays the cursor C1 at a position corresponding to the fifth cell from the left (i.e., the rightmost cell) of the scale image SI. When the change button 121 is operated once while the operation screen shown in FIG. 8E is displayed, the controller 11 updates the operation screen to that shown in FIG. 8F. In other words, the controller 11 changes the object image I1d to the object image I1 indicating that the read density is set at the maximum level. Moreover, the controller 11 displays the cursor C1 at a position corresponding to the leftmost cell of the scale image SI.

When the change button 121 is further operated, the controller 11 updates the operation screen in the following order: FIG. 8B→FIG. 8C→FIG. 8D→FIG. 8E→FIG. 8F→FIG. 8B and so on.

When each of the change buttons 122, 123, and 124 is operated, the controller 11 changes the processing parameter for the processing condition corresponding to the operated change button. In this case, the controller 11 changes the object image displayed in the display region 141*a* and makes the display region 141*b* display options for the processing parameter as well as information about the selected processing parameter.

Figure 9:
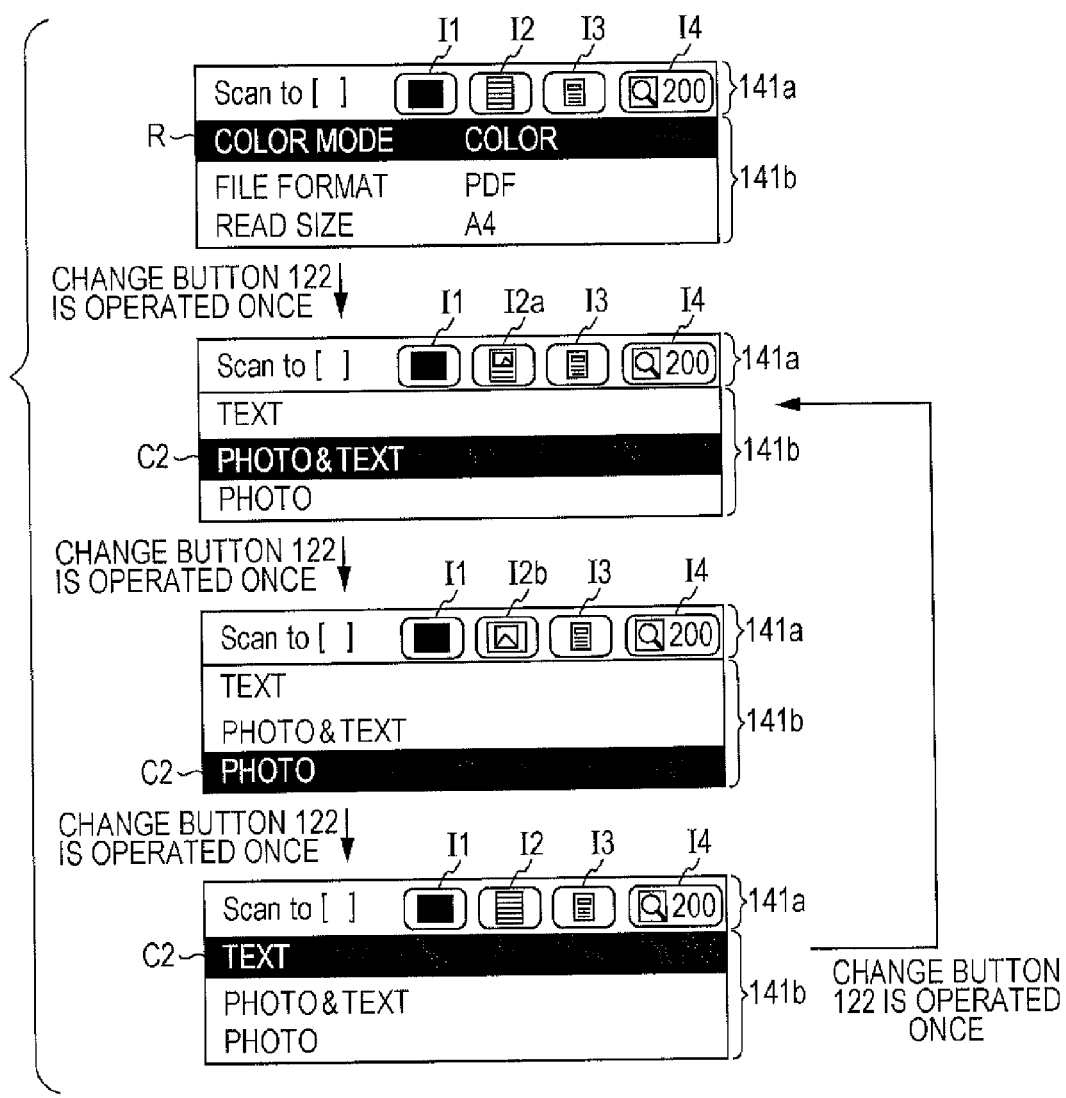
FIG. 9 illustrates the transition of the operation screen in the image forming apparatus when a document-type processing parameter is changed.

FIG. 9 illustrates the transition of the operation screen when the document-type processing parameter is changed. As shown in FIG. 9, every time the change button 122 is operated once, the controller 11 changes the object image I2 in the following order: I2*a*→I2*b*→I2 and so on. Furthermore, in order to set a cursor C2 on a selected processing parameter option in the display region 141*b*, the controller 11 moves the cursor C2 in the following order: "photo and text"→"photo"→"text" and so on.

Figure 10:
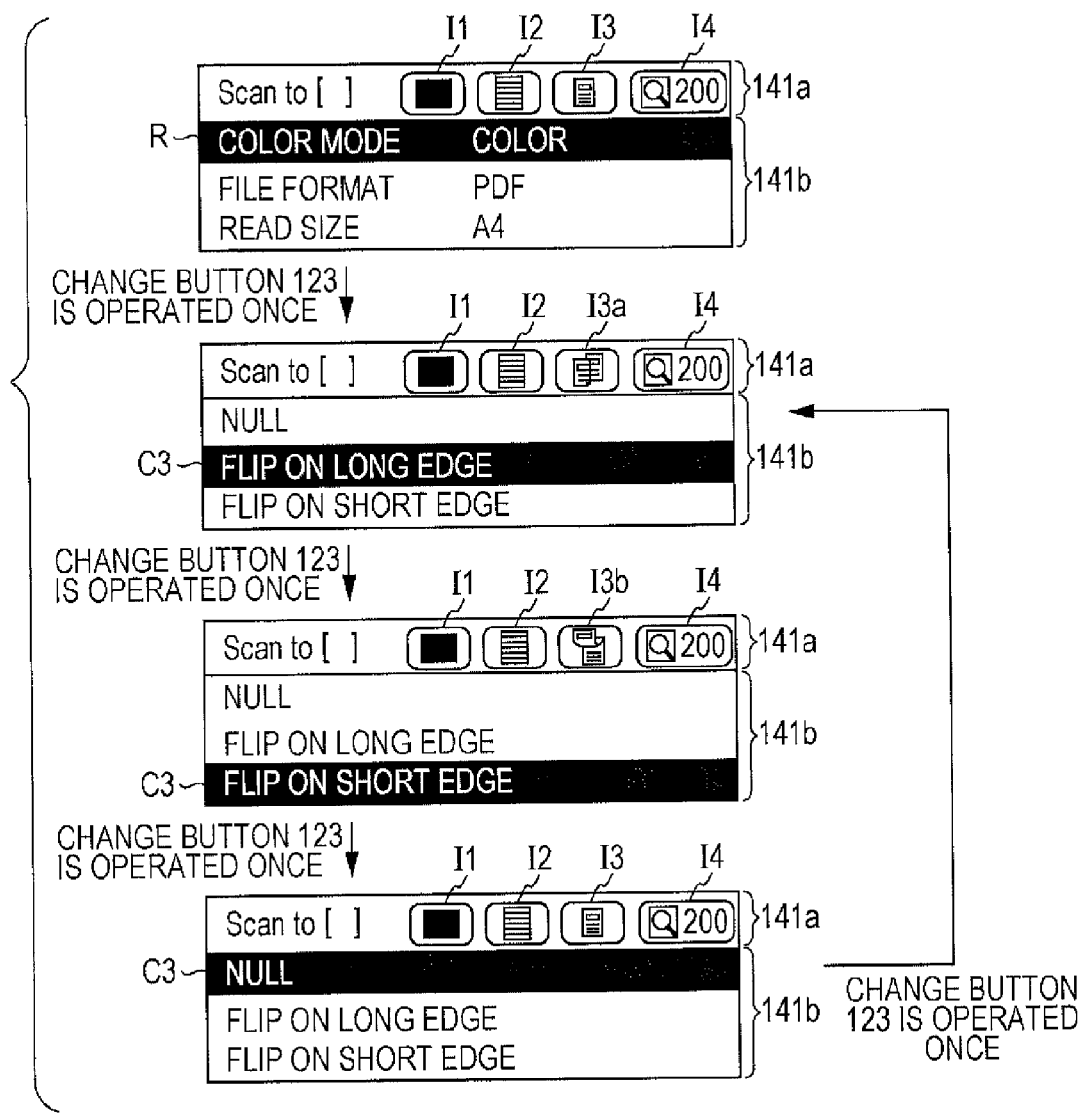
FIG. 10 illustrates the transition of the operation screen in the image forming apparatus when a processing parameter for a double-faced folded document condition is changed.

FIG. 10 illustrates the transition of the operation screen when the processing parameter for the double-faced folded document condition is changed. As shown in FIG. 10, every time the change button 123 is operated once, the controller 11 changes the object image I3 in the following order: I3*a*→I3*b*→I3 and so on. Furthermore, in order to set a cursor C3 on a selected processing parameter option in the display region 141*b*, the controller 11 moves the cursor C3 in the following order: "null"→"Flip on Long Edge"→"Flip on Short Edge" and so on.

Figure 11:
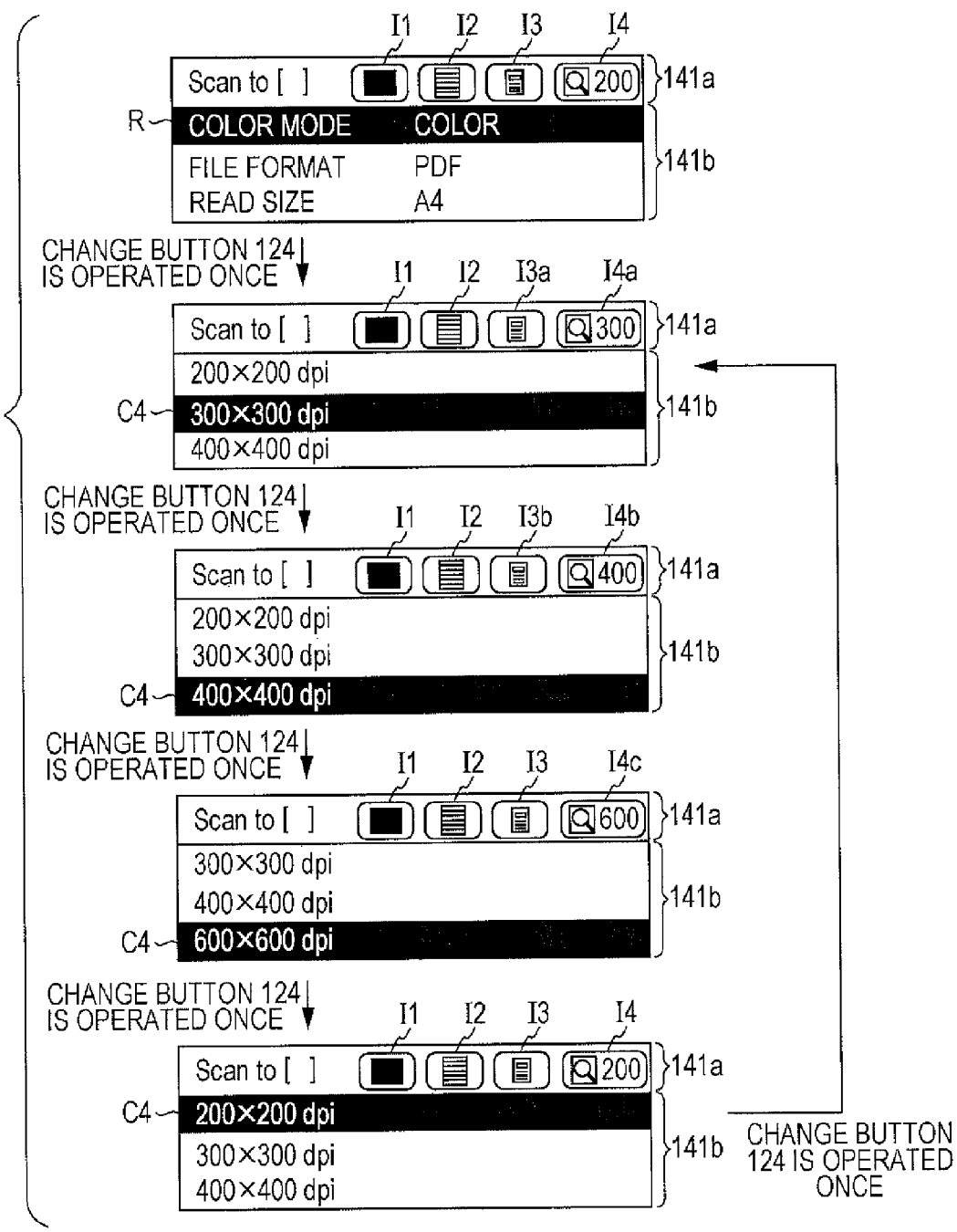
FIG. 11 illustrates the transition of the operation screen in the image forming apparatus when a transmission-resolution processing parameter is changed.

FIG. 11 illustrates the transition of the operation screen when the transmission-resolution processing parameter is changed. As shown in FIG. 11, every time the change button 124 is operated once, the controller 11 changes the object image I4 in the following order: I4*a*→I4*b*→I4*c*→I4 and so on. Furthermore, in order to set a cursor C4 on a selected processing parameter option in the display region 141*b*, the controller 11 moves the cursor C4 in the following order: "300×300 dpi"→"400×400 dpi"→"600×600 dpi"→"200× 200 dpi" and so on.

Since there are four options for the transmission-resolution processing parameter, not all options are displayable in the display region 141*b* at the same time. When the change button 124 is operated in a state where the cursor C4 is set on "400×400 dpi" displayed at the lowest row, the controller 11 moves the displayed options in the display region 141*b* upward by one row so that the cursor C4 is set on "600×600 dpi" newly displayed at the lowest row.

After the controller 11 determines that an operation for changing a processing parameter is received in step S2 shown in FIG. 7, if the controller 11 determines that the operation for changing a processing parameter is not performed by using the change buttons, that is, if the controller 11 determines that the operation for changing a processing parameter is performed by using the direction/confirm button 125, in step S3 (NO in step S3), the controller 11 proceeds to step S6. In step S6, the controller 11 updates the operation screen without changing the object images in the display region 141*a*. If an operation involving the use of the direction/confirm button 125 for changing the color-mode processing parameter is received, the controller 11 updates the operation screen in the following manner.

FIGS. 12A to 12D illustrate the transition of the operation screen when the color-mode processing parameter is changed. In this case, the operation screen R shown in FIG. 5 is displayed prior to the changing of the color-mode processing parameter.

Figure 12A:
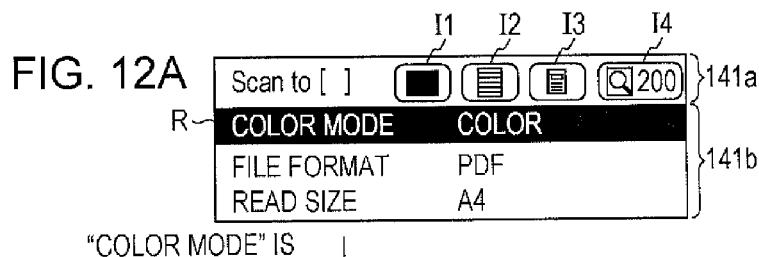
FIGS. 12A to 12D illustrate the transition of the operation screen in the image forming apparatus when a color-mode processing parameter is changed.
Figure 12B:
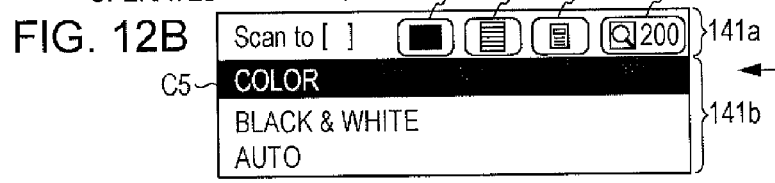
Figure 12C:
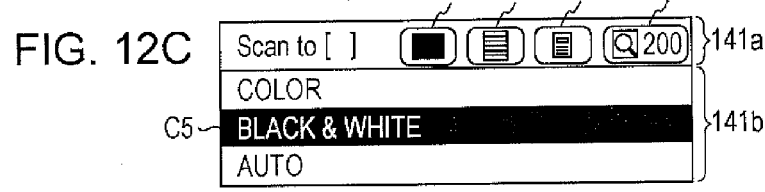
Figure 12D:
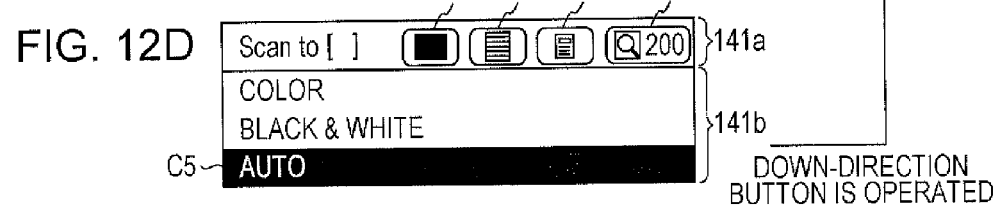

As shown in FIG. 12A, when an operation of one of the direction buttons of the direction/confirm button 125 is received, the controller 11 moves a cursor C5 to an area where color-mode information is displayed in accordance with this operation. Then, when the confirm button of the direction/confirm button 125 is pressed, the controller 11 updates the operation screen to that shown in FIG. 12B. In the operation screen shown in FIG. 12B, options for the color-mode processing parameter are displayed in the display region 141*b*. In the operation screen shown in FIG. 12B, the cursor C5 is set on "color" indicating the selected processing parameter. When an operation of the down-direction button of the direction/confirm button 125 is received while the operation screen shown in FIG. 12B is displayed, the controller 11 moves the cursor C5 downward by one row, as shown in FIG. 12C, so as to set the cursor C5 on "Black & White". When an operation of the down-direction button of the direction/confirm button 125 is received while the operation screen shown in FIG. 12C is displayed, the controller 11 moves the cursor C5 downward by one row, as shown in FIG. 12D, so as to set the cursor C5 on "auto". Furthermore, when an operation of the down-direction button of the direction/confirm button 125 is received while the operation screen shown in FIG. 12D is displayed, the controller 11 sets the cursor C5 on "color" again, as shown in FIG. 12A.

When an operation of the up-direction button of the direction/confirm button 125 is received, the controller 11 may move the cursor C5 upward by one row.

When the confirm button of the direction/confirm button 125 is operated in a state where the cursor C5 is set on any one of the options for the color-mode processing parameter, the controller 11 updates the information about the selected processing parameter stored in the memory or the storage unit 17 so as to set that processing parameter in a selected state.

When changing each of the file-format and read-size processing parameters, the controller 11 receives an operation involving the use of a cursor for selecting a processing condition as well as an operation for selecting the processing parameter for that processing condition. With regard to specific examples of the screen transition, descriptions and illustrations thereof will be omitted here since they are substantially similar to the description and illustration with respect to the color mode with reference to FIGS. 12A to 12D.

The description will continue with reference to FIG. 7 again.

If the determination result in step S2 indicates "NO", that is, if the controller 11 determines that an operation for changing a processing parameter is not received, the controller 11 proceeds to step S7. Then, in step S7, the controller 11 determines whether an operation for designating a registration ID in the address book data 171 is received. In this case, the controller 11 determines whether a numerical value designated by an operation of the numerical buttons of the numerical keypad 126 matches the registration ID. If the determination result in step S7 indicates "NO", the controller 11 proceeds to step S5.

If the controller 11 determines that an operation for designating a registration ID is received (YES in step S7), display information about the destination designated by the registration ID is displayed in the display region 141*a* in step S8. In this case, it is assumed that an operation for designating "12 " as the registration ID is received by the controller 11. Moreover, it is assumed that the operation screen prior to the designation of this registration ID is the operation screen R shown in FIG. 13A. In this case, the controller 11 updates the operation screen to that shown in FIG. 13B in step S8.

In other words, before or during an operation performed on the numerical keypad 126 for designating the registration ID, the controller 11 does not display the information of the address book data 171 on the display panel 141. Subsequently, when the registration ID designated by the user matches the registration ID included in the address book data 171, the controller 11 displays the destination name stored in correspondence with this registration ID in place of the object images displayed in the display region 141*a*. In the example shown in FIG. 13B, the controller 11 displays a character string "Taro Yamada", which is the destination name stored in correspondence with the registration ID "12" in the address book data 171, in place of the object images I1 to I4. In other words, the controller 11 deletes the object images I1 to I4 so as to ensure a display position for the destination name to which data is to be transmitted. Furthermore, in the display region 141*a*, the controller 11 displays the character string "Scan to [12]" at the left side of the destination name.

Subsequently, in step S9, the controller 11 determines whether any operation performed on the operable unit 12 is received. If the controller 11 determines that there is no reception of an operation performed on the operable unit 12 (NO in step S9), the controller 11 determines whether a preset time period has elapsed in step S10. The controller 11 may use a timer (not shown) to measure the elapsed time from the time point at which the destination name is displayed in the display region 141*a*, and may determine whether the preset time period has elapsed. This preset time period is fixed to a time period set in advance and may be, for example, 5 seconds. Alternatively, this preset time period may be shorter than 5 seconds or may be longer than 5 seconds.

During a period in which there is no reception of an operation performed on the operable unit 12, the controller 11 waits until the present time period elapses while maintaining the destination name in a displayed state in the display region 141*a* (NO in step S10). Then, if the controller 11 receives an operation performed on the operable unit 12 before the preset time period elapses (YES in step S9) or determines that the preset time period has elapsed without receiving an operation performed on the operable unit 12 (YES in step S10), the controller 11 ends the display of the destination name in the display region 141*a* and sets the display back to the object images in step S11. As shown in FIG. 13C, the controller 11 displays the object images I1 to I4 in the display region 141*a* again in place of the destination name "Taro Yamada" stored in correspondence with the registration ID "12" in the address book data 171.

If the controller 11 receives an operation performed on the operable unit 12 before the preset time period elapses (YES in step S9), the controller 11 proceeds to step S11 so as to immediately set the display back to the object images. In other words, if the controller 11 receives an operation performed on the operable unit 12 during the display of the display information, the controller 11 sets the display back to the object images before executing a process in accordance with that operation.

With regard to steps S9 to S11, a modification in which the controller 11 is configured not to receive an operation during the display of the display information is permissible, or a modification in which the controller 11 maintains the display of the display information and executes a process in accordance with the received operation is permissible. Furthermore, the controller 11 may alternatively display an electronic mail address, which is transmission destination information, instead of displaying the destination name as the display information.

After the data-transmission destination and the processing parameters are designated by the user, if the controller 11 determines that an operation for designating a start of information processing is received in step S5 (YES in step S5), the controller 11 executes information processing in accordance with that operation in step S12. In this case, the controller 11 executes scan processing on the basis of information about the selected processing parameters stored in the memory or the storage unit 17. In other words, the controller 11 uses the communication unit 13 to transmit image data generated by the image reading unit 15 to the transmission destination specified by the electronic mail address stored in the address book data 171 in correspondence with the registration ID designated by the user.

The flow of processing performed when the image forming apparatus 10 executes scan processing has been described above.

Figure 13A:
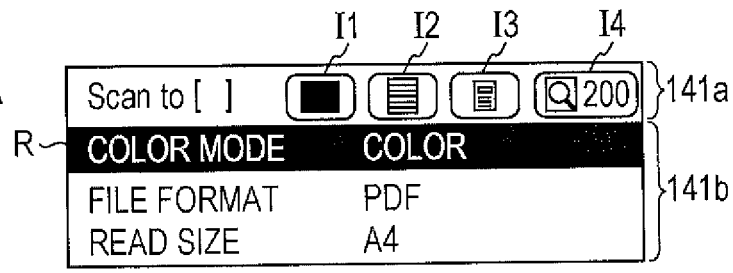
FIGS. 13A to 13C illustrate the transition of the operation screen in the image forming apparatus based on a display method A.
Figure 13B:
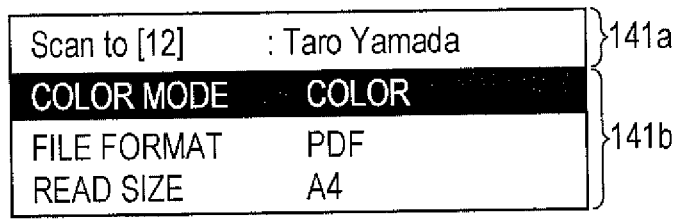
Figure 13C:
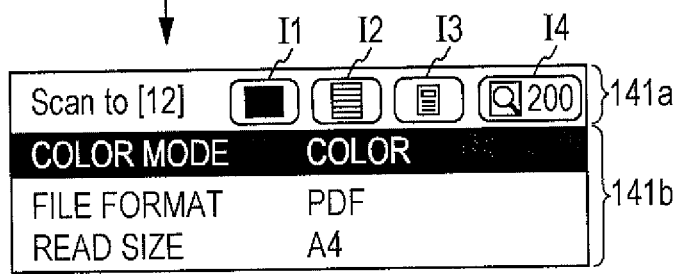

In a case where the method of displaying the display information described with reference to FIGS. 13A to 13C is referred to as "display method A" for the sake of convenience, the image forming apparatus 10 may display the display information based on a display method B or a display method C different from the display method A. In the display method B and the display method C, the image forming apparatus 10 sequentially displays multiple pieces of display information, including the information about the data-transmission destination, in a switching manner in place of the object images.

Figure 14A:
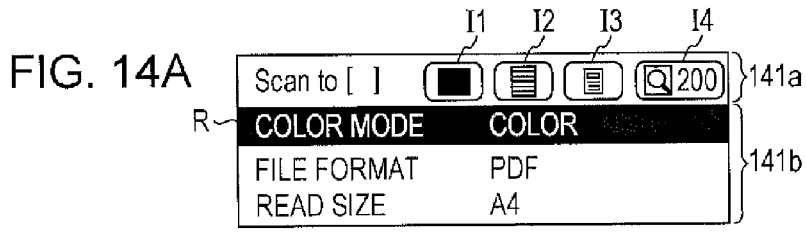
FIGS. 14A to 14E illustrate the transition of the operation screen in the image forming apparatus based on a display method B.
Figure 14B:
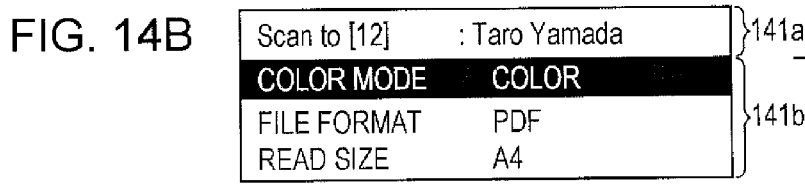
Figure 14C:
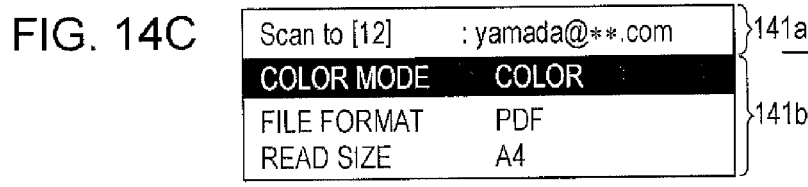
Figure 14D:
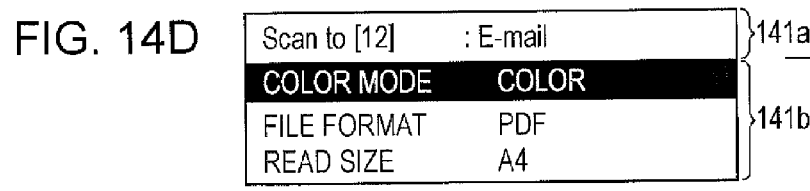
Figure 14E:
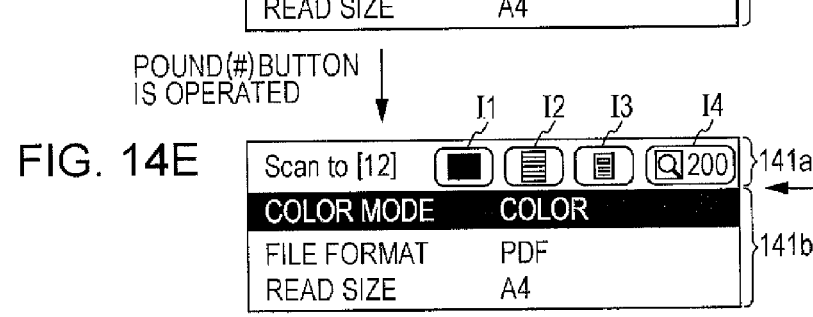

First, the display method B will be described. In the display method B, when a registration ID is designated while the operation screen R shown in FIG. 14A is displayed, the controller 11 displays a destination name in place of the object images I1 to I4 (see FIG. 14B). Then, when the pound (#) button of the numerical keypad 126 is operated, the controller 11 switches the displayed destination name to an electronic mail address stored in correspondence with the registration ID together with this destination name and displays the electronic email address (see FIG. 14C). Subsequently, when the pound (#) button of the numerical keypad 126 is operated, the controller 11 switches the displayed electronic mail address to a character string "E-mail" indicating a data transmitting unit and displays the character string (see FIG. 14D). Then, when the pound (#) button of the numerical keypad 126 is operated, the controller 11 sets the display back to the object images I1 to I4 from the displayed character string "E-mail" (see FIG. 14E). If the pound (#) button of the numerical keypad 126 is not successively operated for a preset time period during the display of the display information shown in FIGS. 14B to 14D, the controller 11 sets the display back to the object images I1 to I4. In this case, the preset time period may be the same as or different from the preset time period used in the display method A.

Next, the display method C will be described. Referring to FIGS. 15A to 15E, in the display method C, the controller 11 switches the display information every time a preset time period elapses. The display information displayed in the display method C in this case is the same as the display information displayed in the display method B. In other words, the display method C is different from the display method B in that the display information is switched when the preset time period elapses instead of when an operation is performed by the user. The preset time period in this case may be the same as or different from the preset time period used in the display method A. Furthermore, the preset time periods for the multiple pieces of display information may be the same or may be different from each other.

The image forming apparatus 10 may select any one of the display method A, the display method B, and the display method C and display the display information based on the selected display method. For example, the image forming apparatus 10 may select any one of the display methods in accordance with a user's command.

Although the operation of the image forming apparatus 10 has been described above with reference to scan processing as an example, the image forming apparatus 10 similarly executes the processing described with reference to FIG. 7 when performing facsimile transmission processing. Scan processing and facsimile transmission processing differ from each other in terms of different types of processing parameters and different object images, and also differ from each other in whether an electronic mail address or a facsimile number is used as transmission destination information. However, with regard to the process for temporarily displaying the display information in place of the object images, the image forming apparatus 10 is capable of executing the process in both scan processing and facsimile transmission processing.

In the image forming apparatus 10 according to the above-described exemplary embodiment, when a data-transmission destination is selected from the address book data 171, display information including information about the selected destination is temporarily displayed in place of the object images indicating the processing parameters. This is because, when the user of the image forming apparatus 10 selects the data-transmission destination, it is conceivable that there is a relatively high possibility that the user visually checks the display information displayed at the image forming apparatus 10. Furthermore, because the image forming apparatus 10 displays the object images and the information about the data-transmission destination at different timings, the information about the processing parameters and the information about the destination are both displayable even when the display region of the display panel 141 is limited, such as when a display region for displaying these pieces of information at the same time is not ensured.

For example, if the user has a registration ID memorized, there is a case where the user designates the registration ID by operating the numerical keypad 126 and selects the data-transmission destination from the address book data 171. In this case, the user may possibly select the wrong destination due to, for example, misidentification of the registration ID, thus leading to erroneous transmission. In contrast, with the image forming apparatus 10, the possibility of erroneous transmission occurring without the user knowing it may be reduced.

Other exemplary embodiments that are different from the above-described exemplary embodiment of the present invention are permissible. Furthermore, modifications to be described below may be combined.

The display information displayed by the image forming apparatus 10 described in the above exemplary embodiment is merely an example. For example, the image forming apparatus 10 may display other information registered in the address book data 171 in correspondence with a registration ID as the display information. The image forming apparatus 10 may display the local section of an electronic mail address (i.e., the section before the "@" mark) as the display information, or may display a regional name specified by a facsimile number as the display information.

In other words, based on the information registered in the address book data 171, the image forming apparatus 10 may display information for identifying the data-transmission destination or may display information including items related to the information processing to be executed.

Although the preset time period for regulating the display period of the display information is fixed in the above exemplary embodiment, the image forming apparatus 10 may have a configuration for adjusting this preset time period.

FIG. 16 is a flowchart illustrating the flow of processing executed when the image forming apparatus 10 sets the preset time period. The steps shown in FIG. 16 are executed by the controller 11 when an operation for designating a registration ID is received in step S7.

In step S71, the controller 11 searches through the address book data 171 for the registration ID designated by the user. Then, in step S72, the controller 11 determines whether the designated registration ID is registered in the address book data 171. If the designated registration ID is registered in the address book data 171 (YES in step S72), the controller 11 reads a communication history of the destination identified by the registration ID from the storage unit 17 so as to acquire the communication history in step S73. In this case, the communication history is a data transmission history in the image forming apparatus 10 and includes, for example, information in which the destination identification information and the time and date of data transmission with the destination are set in correspondence with each other. The controller 11 stores the communication history into the storage unit 17 every time data transmission is performed.

Subsequently, in step S74, the controller 11 determines how frequent communication is performed with the currently selected destination on the basis of the acquired communication history. If the communication frequency is determined to be low (LOW FREQUENCY in step S74), the controller 11 sets the preset time period to be longer than a standard time period in step S75. In this case, the communication frequency is determined in accordance with the number of times data transmission is performed within a predetermined preceding period (e.g., one preceding week) from the current time and date. For example, if the number of past transmission processes determined from the communication history is smaller than a first threshold value (e.g., one), the controller 11 determines that the communication frequency is low. The standard time period may be set in advance as a preset standard time period, for example, at the design stage or by the user. If the standard time period is defined as Td, the controller 11 sets the preset time period to (Td+$\Delta$t1) in step S75.

If the communication frequency is determined to be at an intermediate level (INTERMEDIATE FREQUENCY in step S74), the controller 11 sets the preset time period as the standard time period in step S76. For example, if the number of past transmission processes determined from the communication history is larger than or equal to the first threshold value and is smaller than a second threshold value (e.g., five), the controller 11 determines that the communication frequency is at the intermediate level. In this case, the controller 11 sets the preset time period to Td, which is the standard time period, in step S76.

If the communication frequency is determined to be high (HIGH FREQUENCY in step S74), the controller 11 sets the preset time period to be shorter than the standard time period in step S77. Specifically, if the number of past transmission processes determined from the communication history is larger than or equal to the second threshold value, the controller 11 determines that the communication frequency is high. In this case, the controller 11 sets the preset time period to (Td−Δt1) in step S77.

In step S10, the controller 11 determines whether the preset time period has elapsed on the basis of the preset time period set in step S75, S76, or S77.

If the controller 11 determines that the designated registration ID is not registered in the address book data 171 in step S72 (NO in step S72), the controller 11 ends the processing for setting the preset time period.

With the image forming apparatus 10 according to this modification, the preset time period is extended when transmitting data to destinations with low communication frequency in the past, whereas the preset time period is shortened when transmitting data to destinations with high communication frequency in the past. For example, with regard to a destination with low communication frequency, there is a relatively high possibility that the user does not remember the proper registration ID thereof. In contrast, with regard to a destination with high communication frequency, there is a relatively high possibility that the user remembers the proper registration ID thereof. Therefore, if the communication frequency is relatively low, the image forming apparatus 10 extends the display period for the display information so as to preferentially suppress the occurrence of erroneous transmission. On the other hand, since it is assumed that erroneous transmission is less likely to occur when the communication frequency is relatively high, the image forming apparatus 10 shortens the display period for the destination name so as to preferentially allow the user to ascertain the selected processing parameters.

In the image forming apparatus 10 according to this modification, the preset time period may be adjusted on the basis of a communication history other than the communication frequency. For example, the image forming apparatus 10 may shorten the preset time period for destinations with relatively newer time and date of the last data transmission and may extend the preset time period for destinations with relatively older time and date of the last data transmission. Furthermore, the image forming apparatus 10 may shorten the preset time period for destinations with the larger total number of past data transmission processes and may extend the preset time period for destinations with the smaller total number of past data transmission processes. In a case where the image forming apparatus 10 has a data-receiving function, the preset time period may be set on the basis of a communication history related to data reception.

Furthermore, the image forming apparatus 10 may set the duration of the preset time period by combining multiple pieces of information determined from the communication history. Moreover, the image forming apparatus 10 may change the preset time period in two stages or four or more stages instead of changing the preset time period in three stages.

Furthermore, the image forming apparatus 10 may set the preset time period in accordance with the number of characters displayed at a time as the display information, instead of setting the preset time period on the basis of the communication history. This is conceivably because, the larger the number of characters in the display information, the longer it takes for the user to ascertain the content of the display information. Thus, the controller 11 shortens the preset time period as the number of characters displayed at a time as the display information decreases, and extends the preset time period as the number of characters increases. In this case, for example, if the number of characters in the display information is smaller than a third threshold value, the controller 11 shortens the preset time period by Δt2. If the number of characters in the display information is larger than or equal to a fourth threshold value, which is larger than the third threshold value, the controller 11 extends the preset time period by Δt2. Similar to the above, in this modification, the controller 11 may change the preset time period in two stages or four or more stages instead of changing the preset time period in three stages.

If a specific operation is performed while the display information of the data-transmission destination is displayed, the image forming apparatus 10 may change the destination to another destination registered in the address book data 171 as a selected transmission destination, and may also change the display information.

Figure 17A:
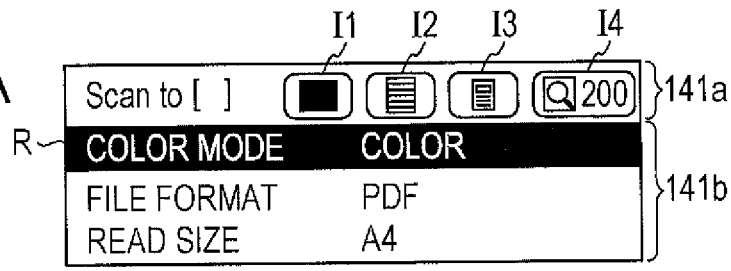
FIGS. 17A to 17C illustrate another example of the transition of the operation screen in the image forming apparatus.
Figure 17B:
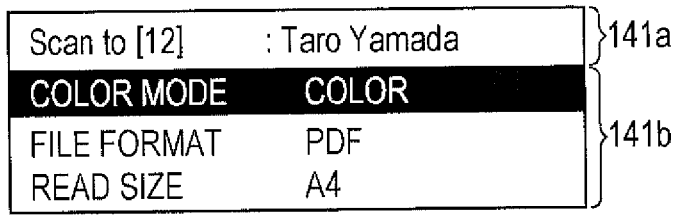
Figure 17C:
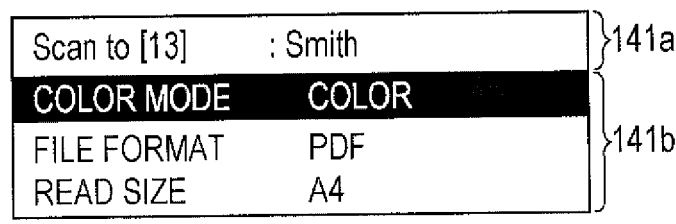

For example, when the registration ID "12" is designated while the operation screen R shown in FIG. 17A is displayed, the controller 11 updates the operation screen to that shown in FIG. 17B. Then, if an operation performed on the asterisk (*) button of the numerical keypad 126 is received during the display of the display information, the controller 11 changes the transmission destination to a destination with a numerical value larger than that of the designated registration ID by one. Moreover, with the change in the transmission destination, the controller 11 displays the corresponding display information. For example, the controller 11 acquires the destination name of an ID "13", which is larger than the registration ID "12" by one, from the address book data 171. In this case, as shown in FIG. 17C, the controller 11 changes the display to "Scan to [13]" and changes the display information from "Taro Yamada" to "Smith". In this modification, if another specific operation button is operated, the controller 11 may change the transmission destination to a destination with a numerical value smaller than that of the designated registration ID by one.

With the image forming apparatus 10 according to this modification, the operational load on the user may be reduced when the user changes a data-transmission destination.

After displaying the display information in place of the object images and then setting the display back to the object images, the image forming apparatus 10 may display the display information again if a specific operation is performed (e.g., if the pound (#) button of the numerical keypad 126 is operated). In this case, the image forming apparatus 10 may re-display the same display information or may display a portion of the display information.

In the above exemplary embodiment, the image forming apparatus 10 displays the display information in place of the object images when an operation for designating a registration ID is received. As an alternative to or in combination with this configuration, the image forming apparatus 10 may display the address book screen on the basis of the address book data 171 and may allow the user to use the address book screen to select a data-transmission destination.

Figure 18A:
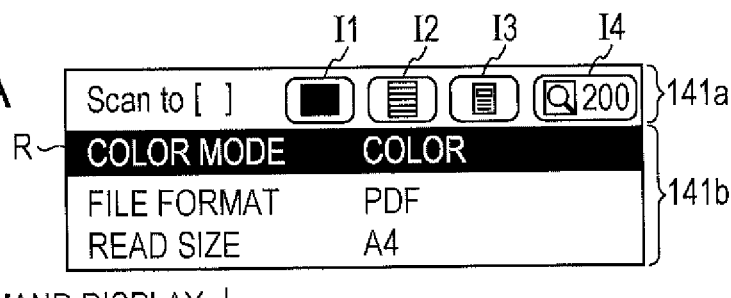
FIGS. 18A to 18C illustrate the transition from an address book screen to the operation screen in the image forming apparatus.
Figure 18B:
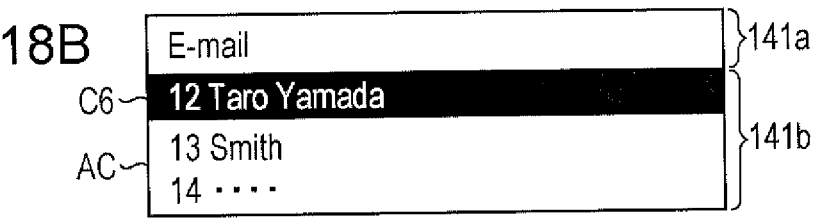
Figure 18C:
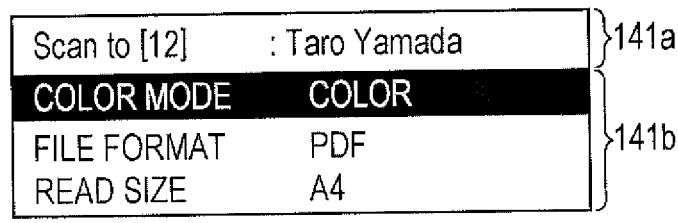

For example, when an operation performed on the address book button 128 is received while the operation screen R shown in FIG. 18A is displayed, the controller 11 displays the address book screen on the display panel 141 on the basis of the address book data 171. Then, while an address book screen AC shown in FIG. 18B is displayed, the user operates the direction/confirm button 125 so as to move a cursor C6 to a character string indicating a data-transmission destination. Referring to FIG. 18B, it is assumed that the confirm button of the direction/confirm button 125 is operated in a state where the cursor C6 is set on the registration ID "12" and the destination name "Taro Yamada". In this case, as shown in FIG. 18C, the controller 11 updates the operation screen so as to display the destination name "Taro Yamada" in place of the object images I1 to I4.

The subsequent operation of the image forming apparatus 10 may be the same as that when the registration ID is designated and the data-transmission destination is selected.

Although the image forming apparatus 10 described above includes four change buttons, namely, the change buttons 121 to 124, the image forming apparatus 10 may alternatively include three or fewer change buttons or five or more change buttons. Therefore, the number of object images displayed in the display region 141a of the image forming apparatus 10 may be three or fewer, or five or more.

Furthermore, the image forming apparatus 10 may display object images indicating selected processing parameters with respect to all processing conditions for information processing.

Furthermore, processing conditions other than the processing conditions corresponding to the object images may be of two or fewer kinds or of four or more kinds.

Furthermore, instead of changing an object image by changing the corresponding processing parameter in accordance with an operation performed on the corresponding change button, for example, the image forming apparatus 10 may receive an operation in which the user manually touches the position of the object image by using a touch-screen overlying the display panel 141 so as to change the processing parameter and the object image.

Furthermore, the display panel 141 is not limited to a type having a rectangular display region that is longer in the horizontal direction than in the vertical direction. The shape and the size of the display region of the display panel 141 are not particularly limited.

Furthermore, the relationship between each operation button operated by the user and processing executed in the image forming apparatus 10 in accordance with that operation is not limited to the relationship described in the above exemplary embodiment. For example, although a registration ID is specified by a numerical value in the above exemplary embodiment, a registration ID may alternatively be specified by another kind of character, such as an alphabetical character. Furthermore, the processing executed by the image forming apparatus 10 when the asterisk (*) button or the pound (#) button is operated may be executed when a different operation is performed.

In other words, the screens displayed at the image forming apparatus 10 and the operations performed by the user by using these screens described in the above exemplary embodiment are merely examples. The design of the screens and the method of how the user performs the operations by using the screens are not limited to the examples described in the exemplary embodiment.

In the above exemplary embodiment, the image forming apparatus 10 is of a console type. Alternatively, the image forming apparatus 10 may be of a so-called desktop type so long as it includes the operable unit and the display described in the above exemplary embodiment.

The information processing apparatus according to the exemplary embodiment of the present invention may be any type of apparatus that performs information processing that involves transmission of data to a destination. When executing information processing other than scan processing and facsimile transmission processing, the information processing apparatus may display object images, indicating processing parameters, and display information. Thus, the processing conditions and the processing parameters described in the above exemplary embodiment are merely examples. The processing conditions and the processing parameters are not limited to specific kinds.

Furthermore, the information processing apparatus according to the exemplary embodiment of the present invention may be an apparatus that causes a display panel included in an external device to display an operation screen.

Furthermore, the information processing apparatus according to the exemplary embodiment of the present invention may be an apparatus that displays an operation screen related to information processing to be executed in an external device.

The functions achieved by the image forming apparatus 10 according to the above exemplary embodiment may be realized with a single hardware circuit or multiple hardware circuits, may be realized by allowing the arithmetic unit to execute a single program or multiple programs, or may be realized with a combination thereof.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display: and
a processor programmed to:
receive an operation for selecting a destination from a transmission destination list containing a registered mail address of the destination to which an image is to be transmitted;
display an object image in a predetermined display region on the display, the object image indicating a parameter of an image reading unit that reads the image;
in response to the operation selecting the destination, display the mail address registered in the transmission destination list on the display in place of the object image; and
in response to a preset time period elapsing from a time point at which the mail address is displayed in the display region, ending the display of the mail address and setting the display back to displaying the object image.

2. The information processing apparatus according to claim 1, wherein the display multiple pieces of information, including information about the destination, in a switching manner; and
set the display back to the object image.

3. The information processing apparatus according to claim 1, wherein the processor is programmed to change a duration of the time period based on a communication history with the selected destination.

4. The information processing apparatus according to claim 1, wherein the processor is programmed to be capable of correcting the time period based on a number of characters in the mail address of the selected destination.

5. The information processing apparatus according to claim 1, wherein:
the transmission destination list contains identification information for identifying the destination; and
the processor is programmed to:
receive the operation based on a character that specifies the identification information; and
start to display information about the destination when the identification information specified by the character matches the identification information contained in the transmission destination list.

6. The information processing apparatus according to claim 1, wherein:
the parameter of the image reading unit includes a plurality of selectively-used parameters; and
the processor is programmed to display the object image of a selected one of the parameters.

7. The information processing apparatus according to claim 1, wherein the object image indicates resolution used when transmitting the image read by the image reading unit.

8. An information processing apparatus comprising:
a display; and
a processor programmed to:
receive an operation for selecting a destination from a transmission destination list containing registered transmission destination information, which is a character string that specifies the destination to which data is to be transmitted; and
display an object image in a predetermined display region on the display, the object image indicating a processing parameter used in information processing that involves transmission of the data;
in response to the operation selecting the destination, display information about the destination registered in the transmission destination list on the display in place of the object image; and
in response to a preset time period elapsing from a time point at which the mail address is displayed in the display region, ending the display of the mail address and setting the display back to displaying the object image.

9. The information processing apparatus according to claim 8, wherein the processor is programmed to:
display multiple pieces of information, including information about the destination, in a switching manner; and
set the display back to the object image.

10. The information processing apparatus according to claim 8, wherein the processor is programmed to change a duration of the time period based on a communication history with the selected destination.

11. The information processing apparatus according to claim 8, wherein the processor is programmed to be capable of correcting the time period based on a number of characters in the mail address of the selected destination.

12. The information processing apparatus according to claim 8, wherein:
the transmission destination list contains identification information for identifying the destination; and
the processor is programmed to:
receive the operation based on a character that specifies the identification information; and
start to display information about the destination when the identification information specified by the character matches the identification information contained in the transmission destination list.

13. The information processing apparatus according to claim 8, wherein:
the parameter of the image reading unit includes a plurality of selectively-used parameters; and
the processor is programmed to display the object image of a selected one of the parameters.

14. The information processing apparatus according to claim 8, wherein the character string that specifies the destination to which the data is to be transmitted is an electronic mail address.

15. The information processing apparatus according to claim 8, wherein the object image indicates a read density of the data to be read by an image reading unit.

16. The information processing apparatus according to claim 8, wherein the object image indicates a type of the data to be read by an image reading unit.

17. The information processing apparatus according to claim 8, wherein the object image indicates resolution used when transmitting the data read by an image reading unit.

18. An information processing apparatus comprising:
a display; and
a processor programmed to:
receive a first operation for selecting a destination from a transmission destination list containing registered transmission destination information, which is a character string that specifies the destination to which data is to be transmitted;
receive a second operation for changing a selected processing parameter among a plurality of processing parameters selectively used in information processing that involves transmission of the data;
dispiay an object image in a predetermined display region on the display, the object image indicating the selected processing parameter;
in response to the operation selecting the destination by the first operation, display information about the destination registered in the transmission destination list on the display in place of the object image;
in response to a preset time period elapsing from a time point at which the mail address is displayed in the display region, ending the display of the mail address and setting the display back to displaying the object image;
when the processing parameter is changed by the second operation, change the displayed object image to an object image indicating the changed processing parameter; and
executes the information processing by using the selected processing parameter.

19. A non-transitory computer readable medium storing a program causing a computer to execute a process for information processing, the process comprising:
receiving an operation for selecting a destination from a transmission destination list containing registered transmission destination information, which is a character string that specifies the destination to which data is to be transmitted;
displaying an object image on an display in a predetermined display region, the object image indicating a processing parameter used in the information processing that involves transmission of the data;
in response to the operation selecting the destination by the first operation, displaying information about the destination registered in the transmission destination list in the display region on the display in place of the object image; and in response to a preset time period elapsing from a time point at which the mail address is displayed in the display region, ending the display of the mail address and setting the display back to the object image.

\* \* \* \* \*